(12) United States Patent
Yang et al.

(10) Patent No.: US 8,228,674 B2
(45) Date of Patent: Jul. 24, 2012

(54) ELECTRONIC DEVICE AND SWITCHING ASSEMBLY THEREOF

(75) Inventors: Xin Yang, Shenzhen (CN); Wei Wu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 381 days.

(21) Appl. No.: 12/549,382

(22) Filed: Aug. 28, 2009

(65) Prior Publication Data

US 2010/0103613 A1 Apr. 29, 2010

(30) Foreign Application Priority Data

Oct. 28, 2008 (CN) .......................... 2008 1 0305247

(51) Int. Cl.
*H05K 7/14* (2006.01)

(52) U.S. Cl. .............. 361/679.58; 361/679.57; 361/726; 312/223.2

(58) Field of Classification Search .......... 361/724–727, 361/740, 741, 747, 754, 756, 759, 732, 679.01, 361/679.02, 679.55–679.58; 312/223.1–223.2; 248/917–924

See application file for complete search history.

(56) References Cited

U.S. PATENT DOCUMENTS

| 7,561,419 | B2 * | 7/2009 | Lee et al. | 361/679.58 |
| 7,824,793 | B2 * | 11/2010 | Zuo et al. | 429/97 |
| 2004/0214077 | A1 * | 10/2004 | Huang | 429/97 |

* cited by examiner

*Primary Examiner* — Jinhee Lee
*Assistant Examiner* — Ingrid Wright
(74) *Attorney, Agent, or Firm* — Altis Law Group, Inc.

(57) ABSTRACT

An electronic device includes a housing and a switching assembly. The housing is configured for receiving a battery. The switching assembly is configured for detachedly assembling the battery with the housing. The switching assembly defines at least one locking portion and comprises a linkage mechanism, at least one restriction portion, and an actuator. The at least one locking portion is disposed in the battery. The linkage mechanism is secured to the housing. The at least one restriction portion is disposed on the linkage mechanism correspondingly to the at least one locking portion. The actuator is secured to the linkage mechanism and drives the at least one restriction portion to lock or unlock with the linkage mechanism when the actuator is pressed.

12 Claims, 5 Drawing Sheets

ELECTRONIC DEVICE AND SWITCHING ASSEMBLY THEREOF

BACKGROUND

1. Technical Field

The present disclosure relates to electronic devices and, particularly, to an electronic device and a switching assembly of a battery of the electronic device.

2. Description of the Related Art

Batteries used in notebooks can provide electronic power to the notebooks for about 2 to 4 hours, spare batteries are used instead when the electronic power of the battery of the notebooks is exhausted. Commonly, a battery is screwed to a notebook via screws, however, assembling the battery to the notebook by screwing down the screws and taking out the battery from the notebooks by unscrewing the screws are unduly time-consuming and inconvenient.

Therefore, it is desirable to provide an electronic device and a switching assembly which can overcome or at least alleviate the above-mentioned problem.

DETAILED DESCRIPTION

Embodiments of the disclosure will now be described in detail with reference to the accompanying drawings.

Figure 1:
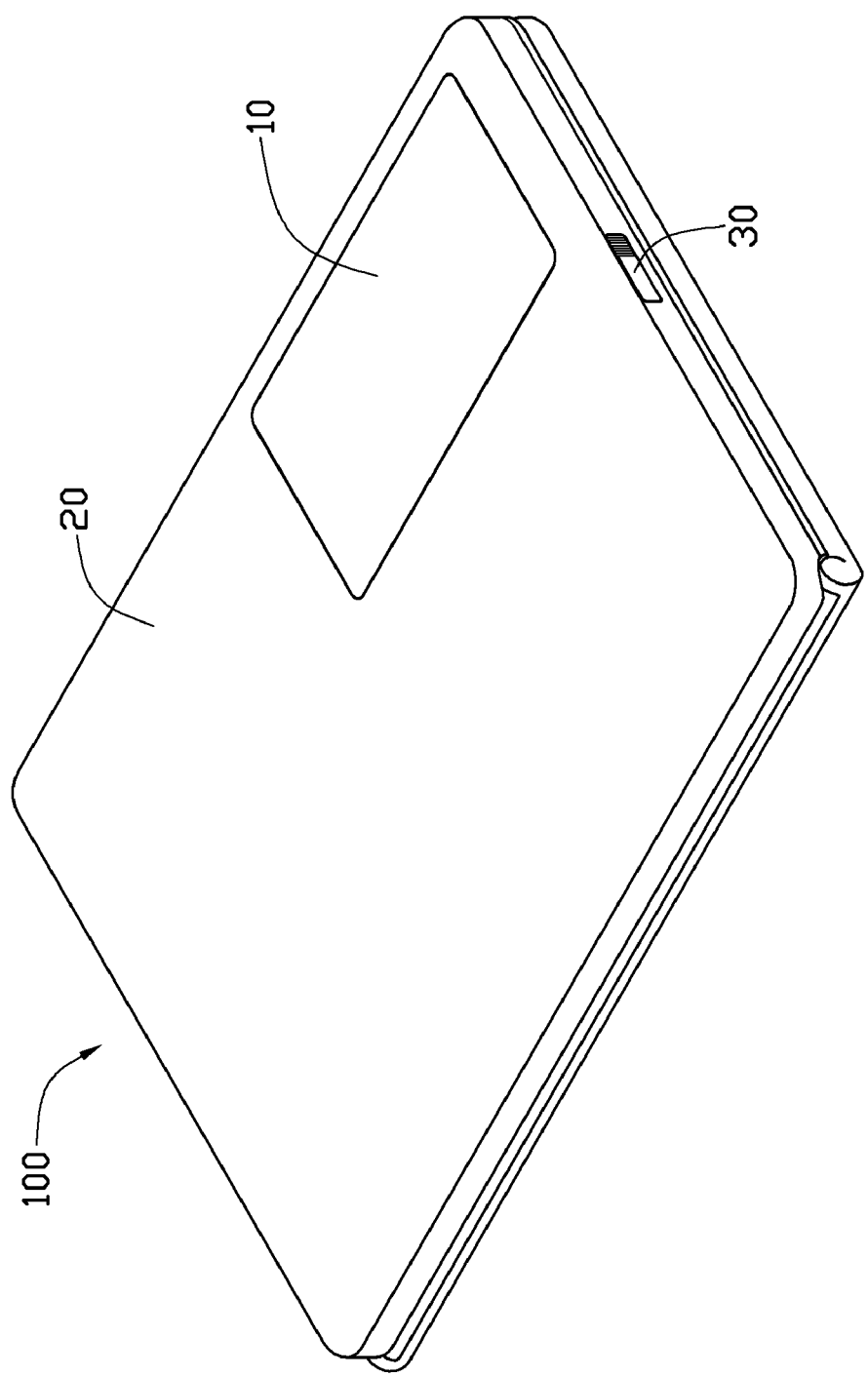
FIG. 1 is a schematic view of an electronic device including a battery according to an exemplary embodiment.

Referring to FIG. 1, an electronic device 100 according to an exemplary embodiment includes a battery 10, a housing 20, and a switching assembly 30. The battery 10 is detachably assembled with the housing 20 via the switching assembly 30.

Figure 2:
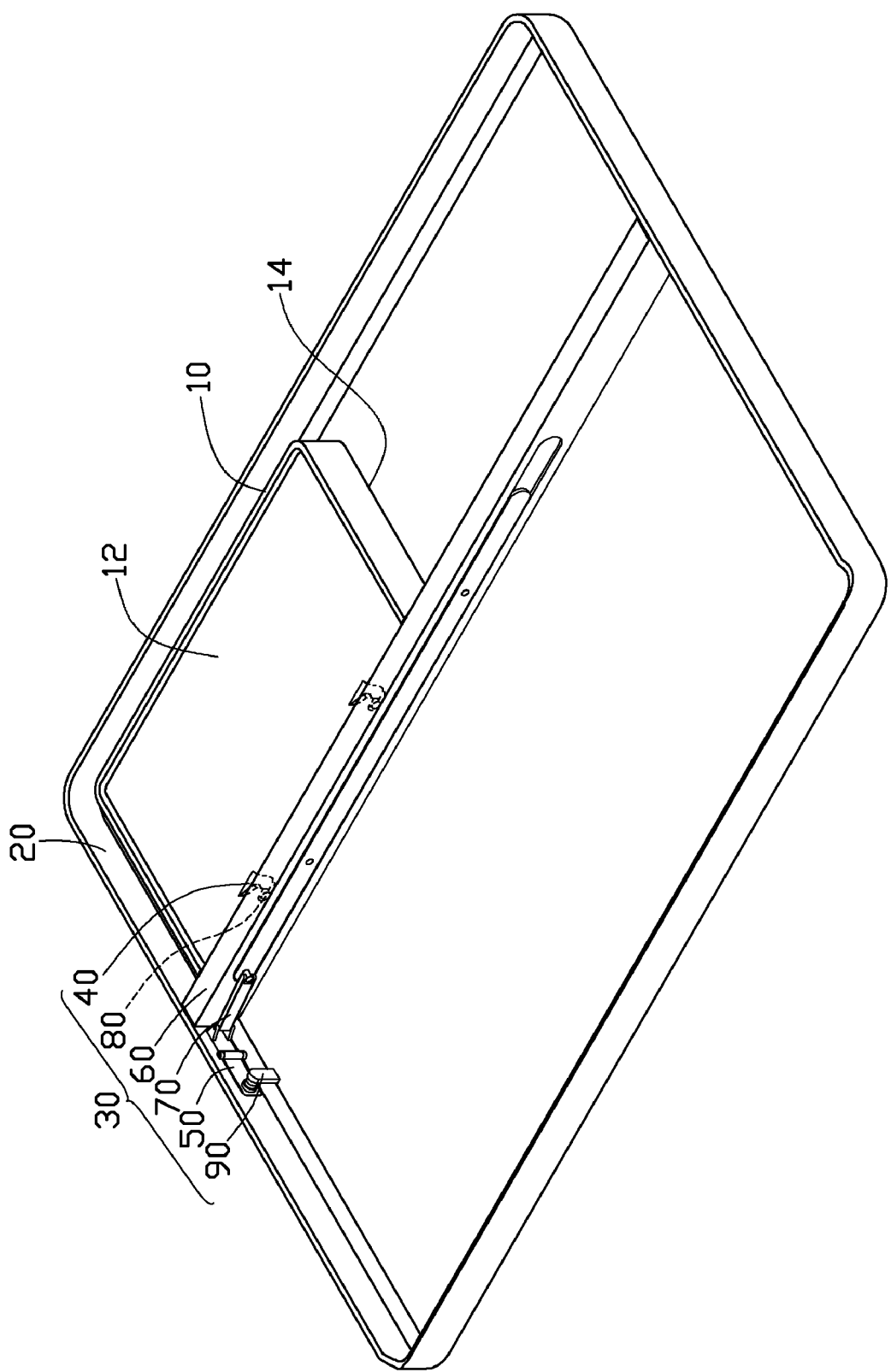
FIG. 2 is a partially schematic view of the electronic device of FIG. 1, showing the battery locked into the electronic device.
Figure 3:
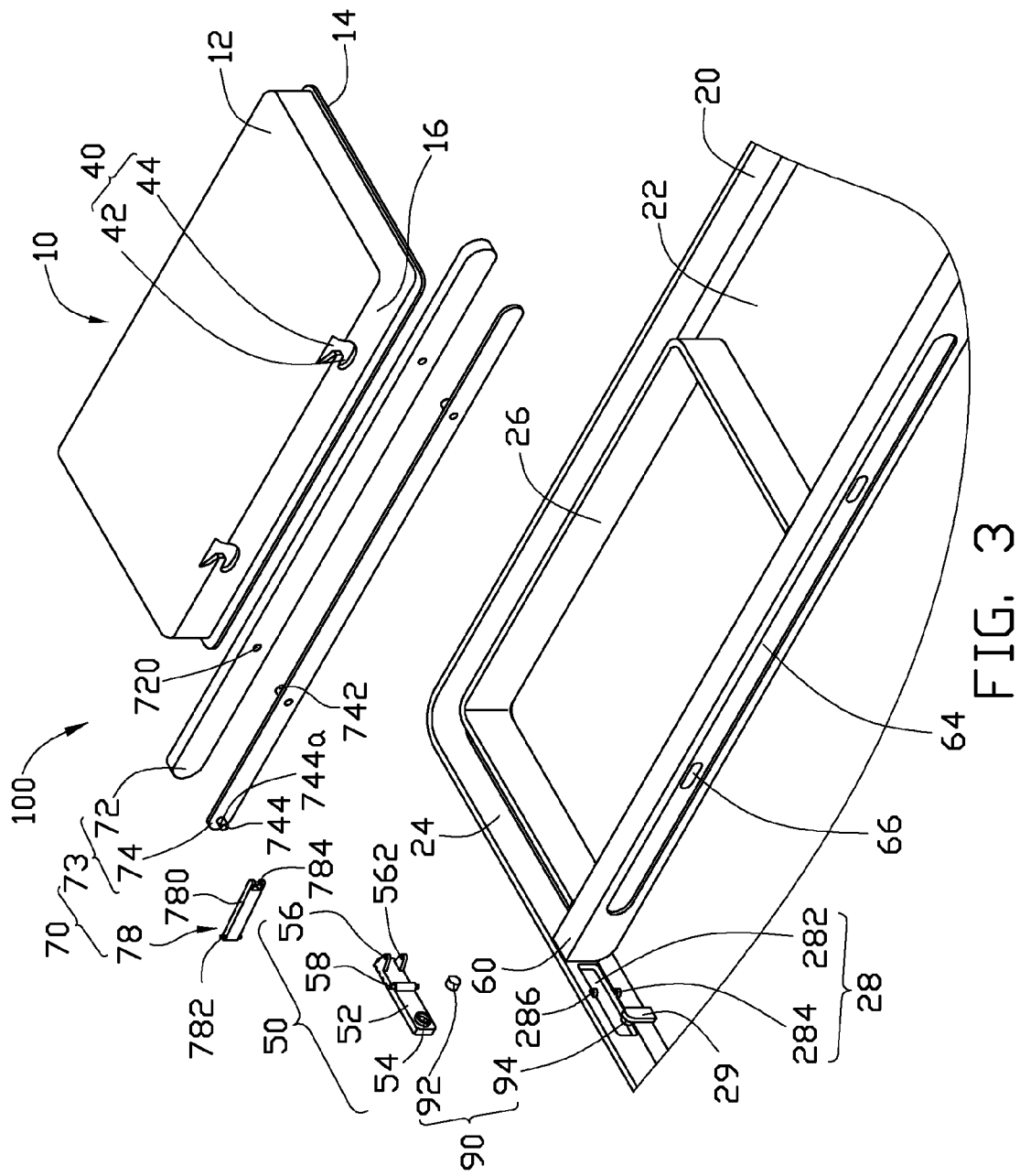
FIG. 3 is a partially disassembled schematic view of the electronic device of FIG. 2.

Referring to FIGS. 2-3, the battery 10 includes an upper surface 12, a bottom surface 14 on another side of the battery 10 opposite to the upper surface 12, and four side surfaces 16 substantially perpendicular to the upper surface 12. When the battery 10 is received in the housing 20, the bottom surface 14 is in contact with the housing 20.

Figure 4:
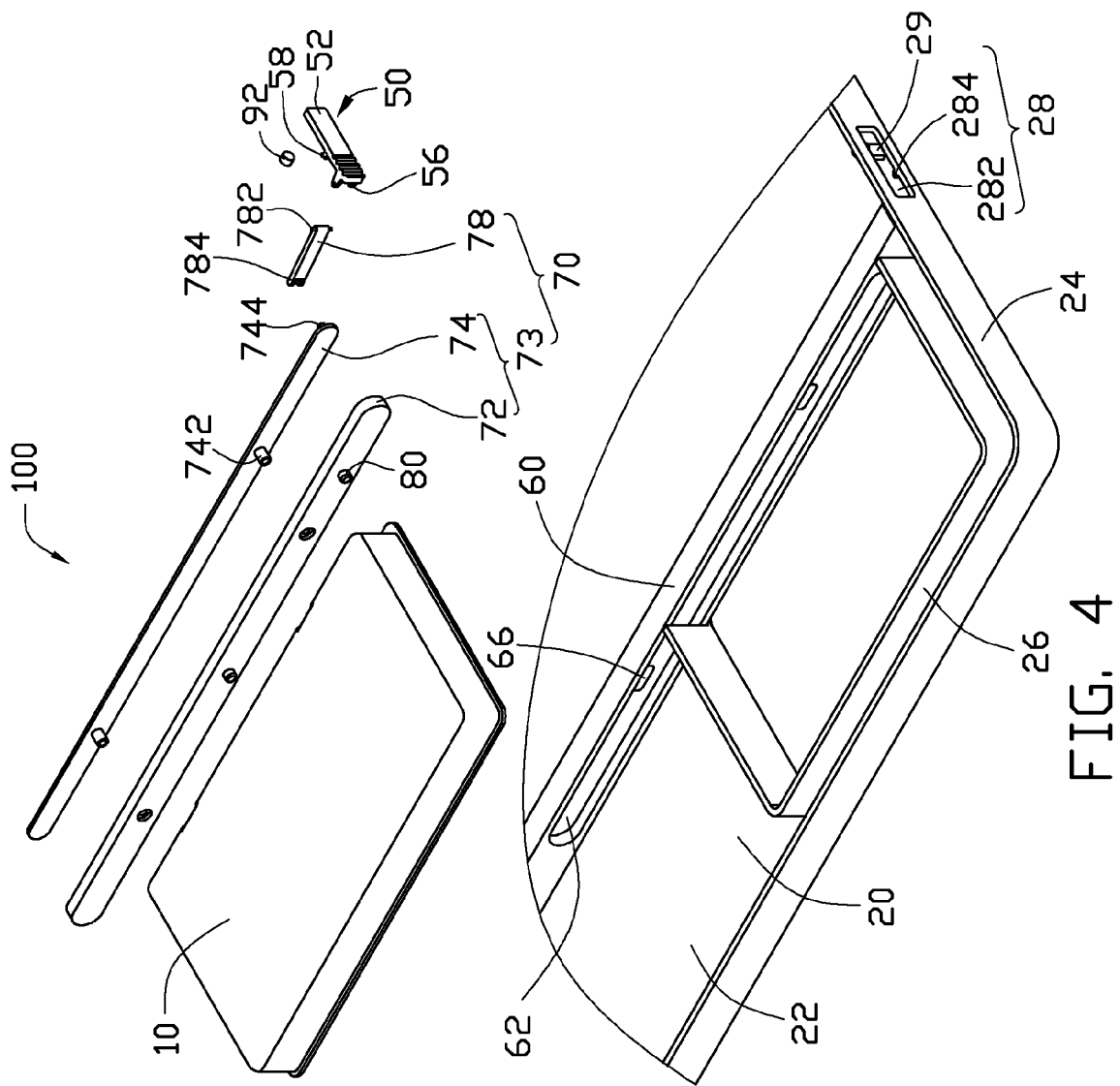
FIG. 4 is a partially disassembled schematic view of the electronic device of FIG. 2 from another angle.

Referring to FIG. 4, the housing 20 includes a substrate 22, a sidewall 24, and a securing plate 29 and defines an assembly portion 28 on the sidewall 24. The sidewall 24 extends from a periphery end of the substrate 22 along a direction substantially perpendicular to the substrate 22. The securing plate 29 is disposed on the sidewall 24 substantially perpendicular to the substrate 22. The substrate 22 defines a receiving space 26 close to the sidewall 24 for receiving the battery 10. The assembly portion 28 defines a first through hole 282 and includes two first blocks 284. The first through hole 282 is defined in the sidewall 24. In this embodiment, the shape of the first through hole 282 is substantially rectangular. Two first blocks 284 are disposed on opposite sides of the first through hole 282 parallel to the substrate 22. Each first block 284 defines a first shaft hole 286 correspondingly.

The switching assembly 30 defines two locking portions 40 and includes an actuator 50, a securing rod 60, a linkage mechanism 70, two restriction portions 80, and a restoring member 90.

The locking portions 40 are defined on the battery 10. In this embodiment, each locking portion 40 defines a latching groove 42 and an opening 44 communicating with the latching groove 42. The latching groove 42 is defined on the side surface 16 of the battery 10. The opening 44 is defined on the upper surface 12 of the battery 10.

It should be mentioned that although two locking portions 40 are disclosed, more locking portions or fewer may be optionally adopted in the disclosed device while remaining well within the scope.

The actuator 50 is fitted into the first through hole 282. The actuator 50 includes a key body 52, two second blocks 56, and a first shaft 58. The shape of the key body 52 is rectangular corresponding to the first through hole 282. One end of the key body 52 defines a recess 54 correspondingly to the securing plate 29. The two second blocks 56 extend from opposite sides of another end of the key body 52 substantially perpendicular to the key body 52. Each second block 56 defines a second shaft hole 562. The first shaft 58 is disposed between two ends of the key body 52 correspondingly to the first shaft holes 286. The actuator 50 is fitted into the first through hole 282 of the assembly portion 28 by pivotally fitting the first shaft 58 in the first shaft holes 286.

The securing rod 60 is secured to the substrate 22 and disposed between the receiving space 26 and the first through hole 282. The securing rod 60 defines a first receiving groove 62, a second receiving groove 64, and two second through holes 66. The first receiving groove 62 is adjacent to the battery 10. The second receiving groove 64 is opposite to the first receiving groove 62. The two second through holes 66 are communicated with the first receiving groove 62 and the second receiving groove 64.

It should be mentioned that although two second through holes 66 are disclosed, more second through holes or fewer may be optionally adopted in the disclosed device while remaining well within the scope.

The linkage mechanism 70 includes a sliding member 73 and a linkage rod 78. The sliding member 73 is secured to the securing rod 60. The linkage rod 78 is connected between the actuator 50 and the sliding member 73.

The sliding member 73 includes a first sliding strip 72 and a second sliding strip 74. The first sliding strip 72 is received in the first receiving groove 62. The second sliding strip 74 is received in the second receiving groove 64. Two third through holes 720 are defined in the first sliding strip 72. Two first protrusions 742 are disposed on the second sliding strip 74 corresponding to the third through holes 720. The first sliding strip 72 is connected to the second sliding strip 74 via the first protrusions 742 being protruded through the second through holes 66 and the third through holes 720. A second protrusion 744 is disposed on an end of the second sliding strip 74 adjacent the linkage rod 78. The second protrusion 744 defines a third shaft hole 744a.

The linkage rod 78 includes a body 780, a second shaft 782, and a third shaft 784. The second and the third shafts 782, 784 are disposed on opposite ends of the body 780 corresponding to the second and the third shaft holes 562, 744a. The linkage rod 78 is rotatably connected to the actuator 50 via the second shaft 782 being pivotally fitted in the second shaft holes 562. The second sliding strip 74 is rotatably connected to the linkage rod 78 via the third shaft 784 being pivotally fitted in the third shaft hole 744a.

In this embodiment, the restriction portions 80 are protrusions disposed on the first sliding strip 72 corresponding to the locking portions 40 on the battery 10. The restriction portions 80 can slide into and are engaged with the latching groove 42, or slide out of the latching groove 42 and into the opening 44.

The restoring member 90 includes a first magnetic member 92 and a second magnetic member 94. The first magnetic member 92 is received in the recess 54 on the key body 52. The second magnetic member 94 is mounted on the upper end of the securing plate 29 corresponding to the first magnetic member 92 and thereby attracting the first magnetic member 92. In this embodiment, the positive polarity of the first magnetic member 92 faces the negative polarity of the second magnetic member 94. In another embodiment, one of the first magnetic member 92 and the second magnetic member 94 is a magnet, and the other of the first magnetic member 92 and the second magnetic member 94 is made of a material attractable by the magnet. For example, the first magnetic member 92 may be a magnet and the second magnetic member 94 may be made of a material attractable with the first magnet member 92, and vice versa.

Figure 5:
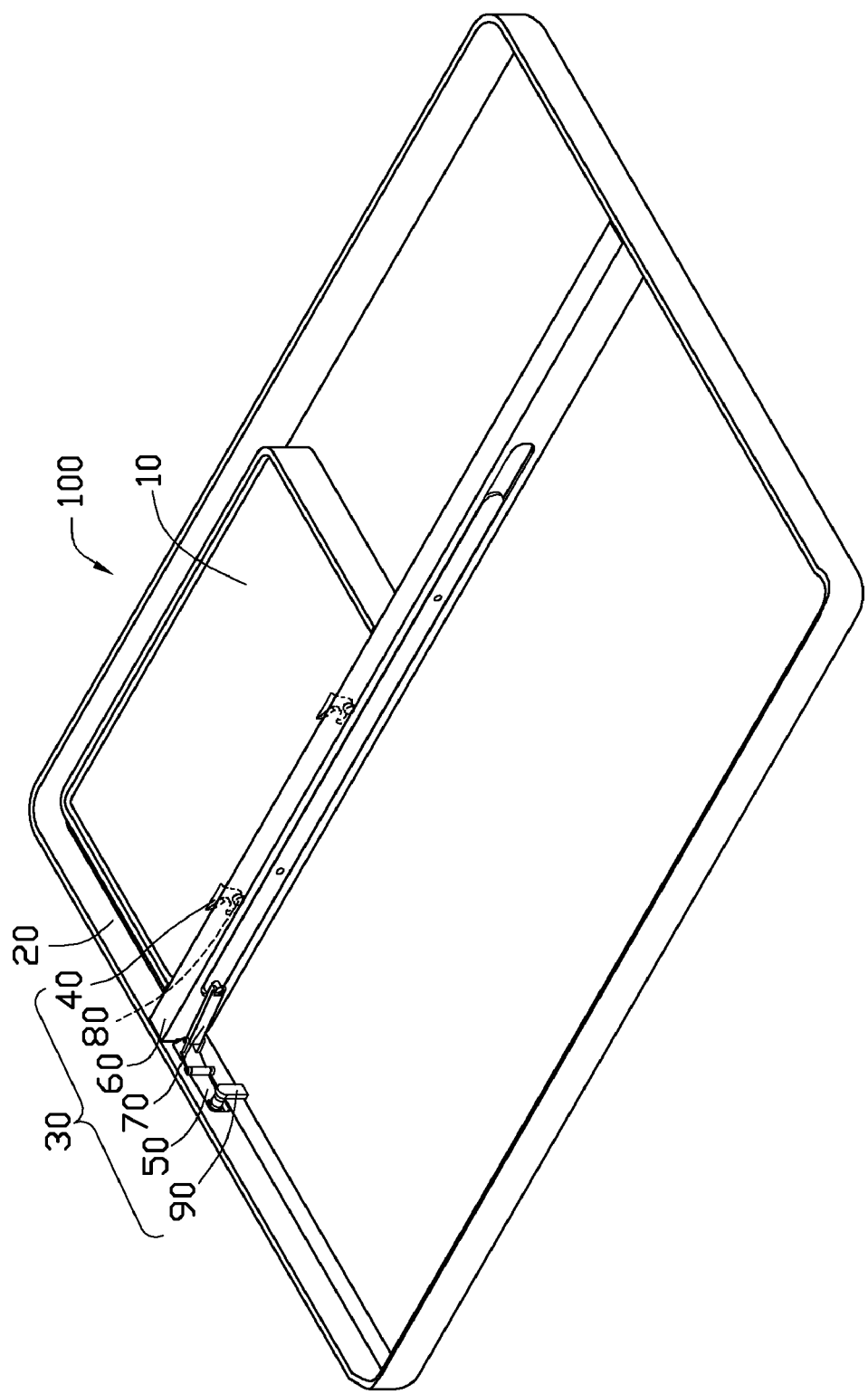
FIG. 5 is similar to the FIG. 2, but showing the battery unlocked.

Referring to FIG. 5, when the battery 10 needs to be moved from the housing 20, the actuator 50 is pressed, thereby, driving the linkage rod 78 and the first sliding strip 72 to move. The second sliding strip 74 moves along a direction parallel to the substrate 22, so that the restriction portions 80 slide out of the latching groove 42 becoming aligned with the opening 44. The restriction portions 80 are therefore separated from the latching portions 40, and the battery 10 can be removed from the housing 20.

Referring back to FIG. 1, when the battery 10 needs to be assembled to the housing 20, the restriction portions 80 are pushed into the opening 40 and the actuator 50 becomes loosened, the second magnetic member 94 attracts the first magnetic member 92 to drive the linking rod 78, the first sliding strip 72, and the second sliding strip 74 to return to an initial position, so that the restriction portions 80 are latched into the latching groove 42. The battery 10 is therefore assembled in the housing 20.

It is to be understood, when the locking portion 40 includes two protrusions, the restriction portion 80 defines two latching grooves corresponding to the protrusions of the locking portion 40.

It is to be understood, however, that even though numerous characteristics and advantages of the embodiments have been set forth in the foregoing description, together with details of the structures and functions of the embodiments, the disclosure is illustrative only, and changes may be made in details, especially in matters of arrangement of parts within the principles of the invention to the full extent indicated by the broad general meaning of the terms in which the appended claims are expressed.

What is claimed is:

1. An electronic device comprising:
    a housing for receiving a battery; and
    a switching assembly configured for detachably assembling the battery with the housing;
    wherein the switching assembly defines at least one locking portion disposed on the battery, and comprises a linkage mechanism secured to the housing, at least one restriction portion is disposed on the linkage mechanism corresponding to the at least one locking portion, and an actuator is secured to the linkage mechanism and is configured for driving the at least one restriction portion to lock or unlock with the linkage mechanism when the actuator is pressed; and
    wherein the switching assembly further comprises a securing rod disposed between the actuator and the battery, the linkage mechanism comprises a sliding member secured to the securing rod and a linkage rod connected between the actuator and the sliding member, the at least one restriction portion is disposed on the sliding member, and the at least one restriction portion is locked or unlocked when the actuator is pressed to drive the linkage rod and the sliding member to move.

2. The electronic device of claim 1, wherein the switching assembly further comprises a restoring member, and the restoring member comprises a first magnetic member disposed on the actuator and a second magnetic member disposed on the housing corresponding to the first magnetic member and attracted by the first magnetic member.

3. The electronic device of claim 1, wherein the housing comprises a sidewall and defines an assembly portion on the sidewall, the assembly portion defines a first through hole, and the actuator is fitted into the first through hole.

4. The electronic device of claim 1, wherein the securing rod defines a first receiving groove close to the battery and a second receiving groove opposite to the first receiving groove, and the sliding member comprises a first sliding strip received in the first receiving groove and a second sliding strip received in the second receiving groove.

5. The electronic device of claim 4, wherein the securing rod defines at least one second through hole communicated with the first receiving groove and the second receiving groove, the first sliding strip defines at least one third through hole, the second sliding strip comprises at least one first protrusion corresponding to the at least one third through hole, and the first sliding strip is connected to the second sliding strip via the at least one first protrusion being protruded through the at least one second through hole and the at least one third through hole.

6. The electronic device of claim 5, wherein each locking portion defines a latching groove, and each restriction portion is disposed on the first sliding strip corresponding to the latching groove.

7. A switching assembly for detachably assembling a battery with a housing, the switching assembly comprising:
    at least one locking portion disposed in the battery,
    a linkage mechanism secured to the housing;
    at least one restriction portion disposed on the linkage mechanism corresponding to the at least one locking portion; and
    an actuator secured to the linkage mechanism and configured for driving the at least one restriction portion to lock or unlock with the linkage mechanism when the actuator is pressed; and
    a securing rod disposed between the actuator and the battery;
    wherein the linkage mechanism comprises a sliding member secured to the securing rod and a linkage rod connected between the actuator and the sliding member, the at least one restriction portion is disposed on the sliding member, and the at least one restriction portion is locked or unlocked when the actuator is pressed to drive the linkage rod and the sliding member to move.

8. The switching assembly of claim 7, further comprising a restoring member comprising a first magnetic member disposed on the actuator and a second magnetic member disposed on the housing corresponding to the first magnetic member, the second magnetic member being attracted by the first magnetic member.

9. The switching assembly of claim 7, wherein the housing comprises a sidewall and defines an assembly portion on the sidewall, the assembly portion defines a first through hole, and the actuator is fitted into the first through hole.

10. The switching assembly of claim 7, wherein the securing rod defines a first receiving groove close to the battery and a second receiving groove opposite to the first receiving groove, and the sliding member comprises a first sliding strip received in the first receiving groove and a second sliding strip received in the second receiving groove.

11. The switching assembly of claim 10, wherein the securing rod defines at least one second through hole communicated with the first receiving groove and the second receiving groove, the first sliding strip defines at least one third through hole, the second sliding strip comprises at least one first protrusion corresponding to the at least one third through hole, and the first sliding strip is connected to the second sliding strip via the at least one first protrusion being protruded through the at least one second through hole and the at least one third through hole.

12. The switching assembly of claim 11, wherein each locking portion defines a latching groove, and each restriction portion is disposed on the first sliding strip corresponding to the latching groove.

* * * * *